United States Patent [19]

Guldin

[11] 4,000,792
[45] Jan. 4, 1977

[54] BRAKE SHOE AND HEAD ASSEMBLY
[75] Inventor: David R. Guldin, Irwin, Pa.
[73] Assignee: Westinghouse Air Brake Company, Wilmerding, Pa.
[22] Filed: Aug. 28, 1975
[21] Appl. No.: 608,561
[52] U.S. Cl. .............................. 188/242; 188/235; 188/250 G
[51] Int. Cl.² ........................................ F16D 65/06
[58] Field of Search .......... 188/234, 235, 236, 242, 188/243, 244, 245, 246, 247, 248, 250 G, 250 B, 250 C

[56] References Cited
UNITED STATES PATENTS

| | | | |
|---|---|---|---|
| 1,571,241 | 2/1926 | Down | 188/242 |
| 1,743,412 | 1/1930 | Waite | 188/250 C |
| 1,893,306 | 1/1933 | Sargent | 188/243 |
| 2,207,421 | 7/1940 | Tirabasso | 188/250 G |
| 2,821,270 | 1/1958 | Newell et al. | 188/242 |
| 3,235,952 | 2/1966 | Arrasmith | 188/242 |
| 3,912,053 | 10/1975 | Spaeth | 188/236 |

FOREIGN PATENTS OR APPLICATIONS

| | | | |
|---|---|---|---|
| 1,054,480 | 4/1959 | Germany | 188/246 |
| 166,062 | 12/1933 | Switzerland | 188/242 |
| 1,242,781 | 8/1971 | United Kingdom | 188/250 G |

Primary Examiner—Trygve M. Blix
Assistant Examiner—Edward R. Kazenske
Attorney, Agent, or Firm—W. F. Poore; R. W. McIntire, Jr.

[57] ABSTRACT

This invention relates to a brake shoe and brake head assembly wherein a brake head for carrying one type of brake shoe may be modified to enable securing thereto and removing therefrom other types of brake shoes without removing the brake head from a brake lever on which the brake head is pivotally mounted.

2 Claims, 9 Drawing Figures

PRIOR ART

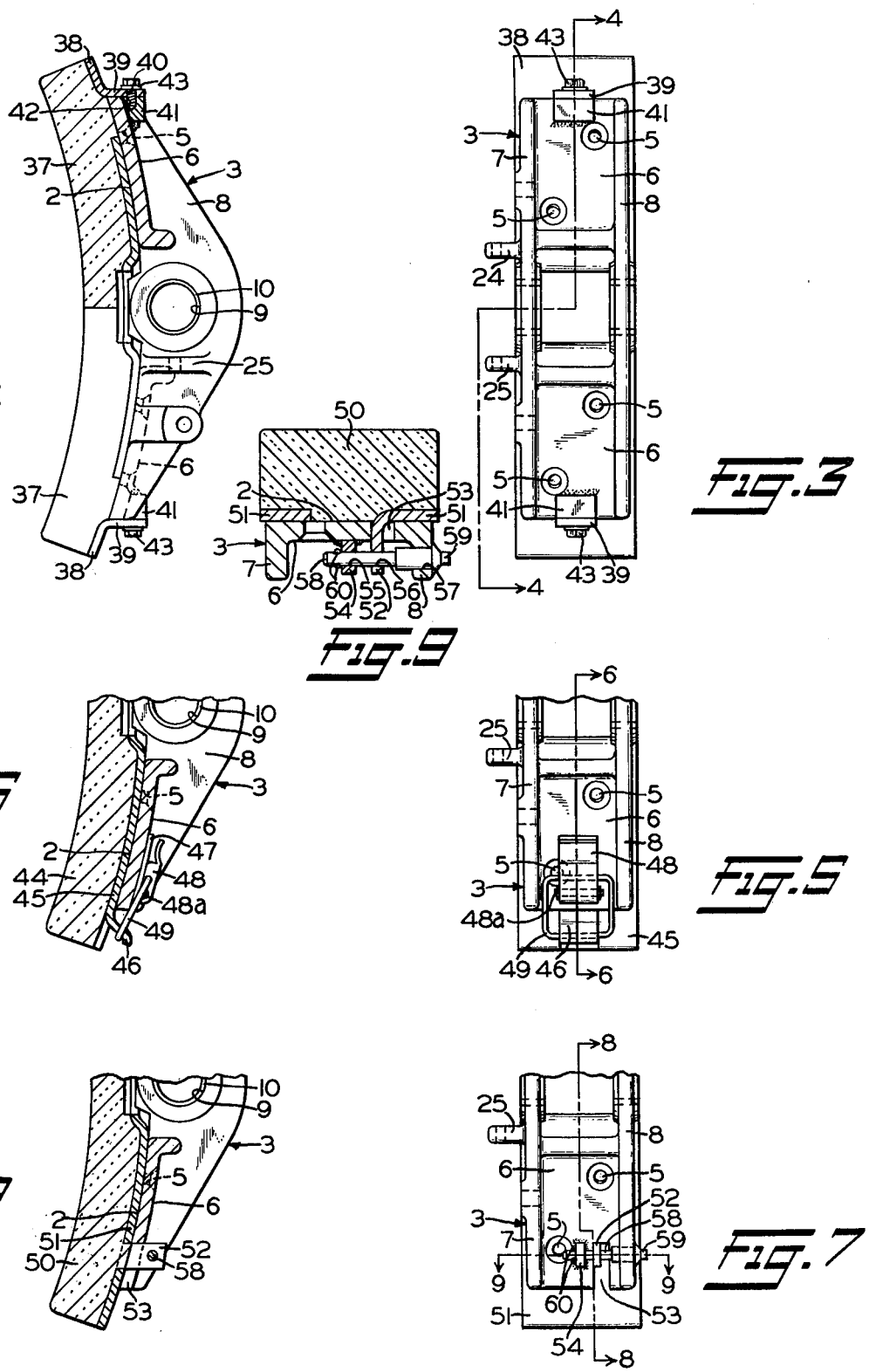

BRAKE SHOE AND HEAD ASSEMBLY

BACKGROUND OF THE INVENTION

Extending from the concave brake shoe receiving surface and through certain types of brake heads to the back of the head are a plurality of countersunk bores through which extend screws that fasten such as a wood brake shoe to the brake head. The useful life of wood brake shoes is comparatively short as compared to the useful life of composition brake shoes. Therefore, heretofore users of wood brake shoes are finding it advantageous and economical to replace wood brake shoes with composition brake shoes. It is apparent that it would be economical to retain the brake heads presently used with the wood brake shoes.

Accordingly, it is the general purpose of the present invention to provide a brake shoe and brake head assembly comprising a composition brake shoe so constructed as to be secured to the concave brake-shoe-receiving surface of brake heads, from which a wood brake shoe has been removed, upon effecting simple additions to and modifications of the brake head.

SUMMARY OF THE INVENTION

According to the present invention, a composition brake shoe is molded to a backing plate that has integral therewith adjacent each of its ends a tab or other means that may be secured to a heretofore used brake head that is modified to receive this composition brake shoe by the addition, at each end thereof, of a locking mechanism that may include a pair of cap screws each passing through a bore provided therefor in one of the tabs and having screw-threaded engagement with internal screw threads formed on the wall of a bottomed bore in each one of a pair of locking members welded to the brake head, a pair of tension latches suitably secured to the brake head and each having a clasp for locking engagement with one of the pair of tabs, or a pair of quick release locking pins each passing through coaxial bores in the tab, a web on the back of the brake head and a lug or locking member secured to the back of the brake head as by welding.

In the accompanying drawings:

FIG. 3 is an end elevational view of a first embodiment of the invention that includes a first locking means whereby the brake head shown in FIG. 1 is so modified as to enable securing thereto a composition brake shoe.

FIG. 4 is a vertical cross-sectional view, taken along the line 4—4 of FIG. 3 and looking in the direction of the arrows, showing certain details of the locking means not made apparent in FIG. 3.

FIG. 5 is an end elevational view of a second embodiment of the invention that includes a second locking means for securing a composition brake shoe to the brake head shown in FIG. 1.

FIG. 6 is a vertical cross-sectional view, taken along the line 6—6 of FIG. 5 and looking in the direction of the arrows, showing certain details of the locking means not made apparent in FIG. 5.

FIG. 7 is an end elevational view of a third embodiment of the invention that includes a third locking means for securing a composition brake shoe to the brake head shown in FIG. 1.

FIG. 8 is a vertical cross-sectional view, taken along the line 8—8 of FIG. 7 and looking in the direction of the arrows, showing certain details of the locking means not made apparent in FIG. 7.

FIG. 9 is a horizontal cross-sectional view, on an enlarged scale, taken along the line 9—9 of FIG. 7 and looking in the direction of the arrows, showing further structural details not made apparent in FIGS. 7 and 8.

DESCRIPTION — FIGS. 1, 2, 3, and 4

Figure 1:
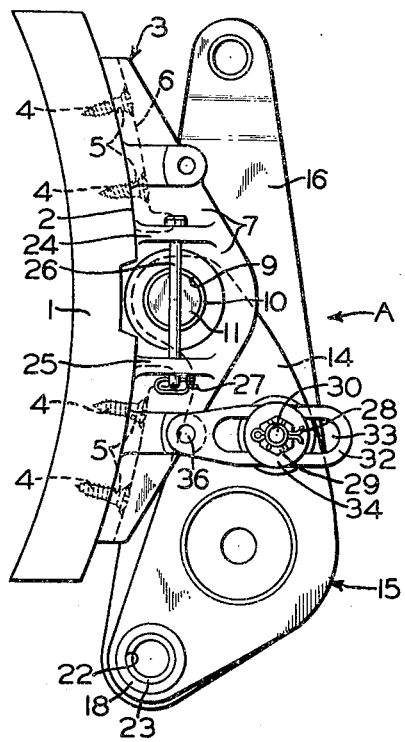
FIG. 1 is a side elevational view of a presently known wood brake shoe secured by screws to a brake head that is pivotally mounted on a brake-applying lever.

Referring to FIG. 1 of the drawings, a wood brake shoe 1 is shown secured to the concave brake shoe receiving surface 2 of a brake head 3 by four screws 4 that pass through countersunk bores 5 extending from this surface 2 to the back 6 of the brake head 3, the countersink extending inward from the back 6.

Figure 2:
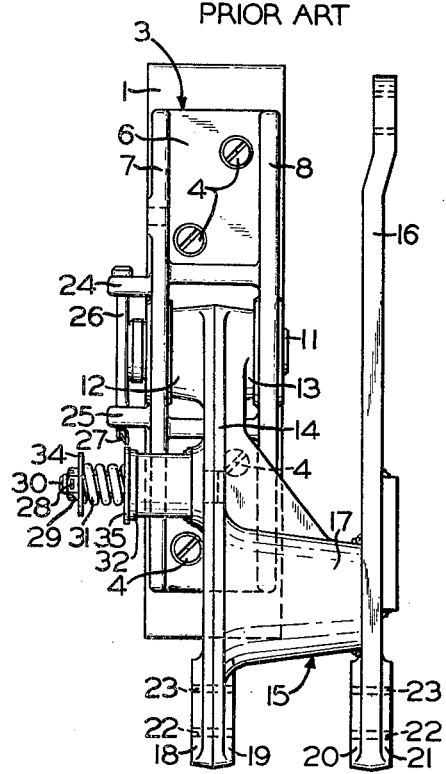
FIG. 2 is an end elevational view of the brake shoe, brake head and brake lever shown in FIG. 1, looking in the direction of the arrow A shown in FIG. 1.

As best shown in FIG. 2, extending from the back 6 of the brake head 3 is a pair of parallel spaced-apart webs 7 and 8 that are cast integral with the brake head 3. The shape of the web 7 is shown in FIG. 1, it being understood that the shape of the web 8 is the same as that of the web 7.

Each of the webs 7 and 8 is provided with a bore 9, the bore in each web being coaxial with that in the other web. A wear bushing 10 is press-fitted into the bore 9 in each of the webs 7 and 8.

The brake head 3 is pivotally mounted on a headed pin 11 that extends with a turning fit through the wear bushings 10 in the webs 7 and 8 and a bore (not shown) provided in a pair of oppositely extending bosses 12 and 13 that are formed integral with the upper end of a short arm 14 of a double-arm brake lever 15 that has a long arm 16 disposed in spaced-apart relation to the short arm 14, as best shown in FIG. 2, these arms being integral with the opposite ends of a connecting hub-like member 17.

As can be seen from FIG. 2, a pair of oppositely extending bosses 18 and 19 are formed integral with the lower end of the short arm 14 of the brake lever 15, and a pair of oppositely extending bosses 20 and 21 are formed integral with the lower end of the long arm 16. Extending through each of these arms and the corresponding bosses is a bore 22 that is coaxial with the bore in the other arm. A wear bushing 23 is press-fitted into each of these bores 22. These wear bushings 23 enable the double-arm brake lever 15 to be rockably mounted on a suitable fulcrum pin (not shown) by some type of brake-applying linkage (not shown) that may be operatively connected to the upper end of the long arm 16. Thus, when the arm 16 is rocked counterclockwise, as viewed in FIG. 1, the brake shoe 1 is brought into braking contact with the tread surface of a vehicle wheel (not shown).

As can be seen from FIGS. 1 and 2, the web 7 is provided with a pair of spaced-apart lugs 24 and 25 each having therein a bore that is coaxial with the bore in the other. Extending through these bores is a headed pin 26 that serves to prevent removal, as by vibration, of the hereinbefore-mentioned headed pin 11 that pivotally mounts the brake head 3 on the arm 14 of the double-arm brake lever 15. A retaining pin 27 that extends through a bore provided therefor in the lower end of the headed pin 26 prevents removal of this pin 26 from the lugs 24 and 25.

As shown in FIGS. 1 and 2 of the drawings, the angular position of the braking surface of the brake shoe 1 can be varied as desired by removing a cotter pin 28 from a slotted nut 29, then rotating this nut 29 on a stud 30 in the direction to relieve the compression on a spring 31 (FIG. 2), and thereafter manually shifting a link 32 that is provided with a slot 33 through which the stud 30 extends in the desired direction until the brake head 3 and brake shoe 1 carried thereby occupy the proper angular position. Thereafter, the slotted nut 29 is tightened on the stud 30 against a washer 34 that compresses this spring 31 the compression of which is transmitted through a second washer 35 to lock the link 32, it being noted from FIG. 1 that the left-hand end of this link 32 is operatively connected to the web 7 of the brake head 3 by a pin 36 one end of which is anchored in this web 7 and the other of which has a turning fit within a bore provided therefor in the link 32.

In actual practice the useful life of a wood brake shoe 1 is comparatively short when compared with the useful life of a composition brake shoe.

Moreover, it has been found in actual practice that as the braking surface of the wood brake shoe 1 wears away, the pointed ends of the screws 4 are likewise worn away so that when replacing a worn wood shoe 1 with a new shoe, the screws 4 cannot be removed by means of a screw driver but must be drilled out as by such as an electric drill.

In order to remove the four screws 4 by means of such as an electric drill, it is necessary that the brake shoe 1 and brake head 3 be disconnected or removed from the short arm 14 of the double-arm brake lever 15. It can be seen from FIGS. 1 and 2 that prior to removal of the brake head 3 and the worn out brake shoe 1 secured thereto from the short arm 14 of the brake lever 15, the retaining pin 27 must be removed from the lower end of the headed pin 26 after which this pin 26 must be withdrawn from the lugs 24 and 25 that are integral with the web 7. Subsequent to this removal of the headed pin 26, the headed pin 11 can be removed by placing one end of such as, for example, a drift pin against the right-hand end of the headed pin 11, as viewed in FIG. 2, and thereafter applying a series of light hammer blows to the other end of this drift pin.

From the foregoing, it is readily apparent that removing the brake head 3 and the brake shoe 1 from the short arm 14 of the brake lever 15 and thereafter removing the four wood screws 4 by means of such as an electric drill is time consuming and, therefore, expensive, especially in view of the fact that the useful life of the wood brake shoe 1 is comparatively short.

Accordingly, it can be understood that it would be most desirable to be able to remove a worn out brake shoe from a brake head 3 and replace it with a new brake shoe without the necessity of removing the brake head 3 from the arm 14 of the brake lever 15.

Therefore, according to a first embodiment of the invention shown in FIGS. 3 and 4 of the drawings, a composition brake shoe 37 is bonded to a metal backing plate 38 it being understood that this bonding is done during the manufacture of the brake shoe.

Prior to bonding the brake shoe material of the brake shoe 37 to the backing plate 38, this backing plate, which is a thin, rectangular metal plate bent to the curvature shown, is provided, as by a stamping operation, with a pair of outwardly extending tabs 39, one adjacent each end of this plate 38. Each of these tabs 39 is provided with an aperture or smooth bore 40.

In order to adapt the brake head 3, from which a worn wood brake shoe 1 (FIG. 1) has been removed in the manner explained above, to receive the composition brake shoe 37, a pair of metallic locking elements or anchor members 41 is secured as, for example, by welding to the back 6 of this brake head 3.

These anchor members 41 are provided with a screw-threaded bottomed bore 42 and are so spaced apart on the back 6 of the brake head 3, as shown in FIGS. 3 and 4, as to enable the composition brake shoe 37 to be secured to this brake head 3 by a pair of cap screws 43, each of which passes through the smooth bore 40 in one of the tabs 39 provided on the backing plate 38 and has screw-threaded engagement with the screw-threaded bottomed bore 42 in the corresponding anchor member 41.

It is apparent from FIGS. 3 and 4 that the composition brake shoe 37 when worn out can be easily removed from the brake head 3 by merely removing the two cap screws 43.

Moreover, it is apparent that a worn out composition brake shoe 37 can be easily removed from the brake head 3 by removing the two cap screws 43 even while the brake head 3 is pivotally connected to the short arm 14 of the brake lever 15 by the headed pin 11, as shown in FIGS. 1 and 2 of the drawings.

Likewise, it is apparent that a new composition brake shoe can be easily secured to the brake head 3 by a pair of cap screws subsequent to removing the worn out composition brake shoe 37.

It should be pointed out that, if new brake heads are to be manufactured for receiving composition brake shoes, such as the brake shoe 37 and its backing plate 38, the two anchor members 41, shown welded to the back 6 of the brake head 3 in FIGS. 3 and 4, may be cast integral with each new brake head.

DESCRIPTION — FIGS. 5 AND 6

In FIGS. 5 and 6 of the drawings there is shown a second embodiment of the invention wherein a brake head 3 is modified to receive a composition brake shoe 44 that is constructed in the manner now to be described.

Prior to bonding the brake shoe material of the brake shoe 44 to a metal backing plate 45, only one half of which appears in FIGS. 5 and 6, this backing plate 45, which is a thin, rectangular metal plate bent to the curvature shown, is provided at each of its ends, as by a stamping operation, with a tab 46, only the lower tab appearing in FIGS. 5 and 6, it being noted from FIGS. 5 and 6 that the shape of this tab is similar to the letter S and that its width is substantially less than the width of the backing plate 45.

In order to adapt the brake head 3, from which a worn wood brake shoe 1 (FIG. 1) has been removed in the manner hereinbefore explained, to receive the composition brake shoe 44 having the backing plate 45, a pair of tension latches 47, only one of which appears in FIGS. 5 and 6, are secured, as by brazing, welding or riveting, to the respective opposite ends of the back 6 of this brake head.

Each of these latches 47 includes a lever 48 having a fulcrum 48a and a clasp 49 rockably mounted on the lever 48 at a location between this fulcrum 48a and one end of this lever. By manually rocking the lever 48 clockwise about its fulcrum 48a from the position in which it is shown in FIG. 6, it is apparent that the clasp 49 can thereafter be rocked counterclockwise and out of latching engagement with the tab 46 on the backing plate 45.

When the clasp 49 of each tension latch 47 is thus rocked out of latching engagement with the corresponding tab 46 on the backing plate 45, this backing plate and the brake shoe 44 bonded thereto may be removed as a unit from the brake head 3.

It is evident that with the pivoted lever 48 of the latch 47 at each end of the back 6 of the brake head 3 rotated to the position in which the clasp 49 of the respective latch 47 will clear the corresponding tab 46, a new brake shoe 44 and backing plate 45 may be placed in abutting relationship with the concave brake shoe receiving surface 2 of the brake head 3. Thereafter, this brake shoe 44 and its backing plate 45 may be removably secured or locked to the brake head 3 by manually rocking each clasp 49 in the direction to cause it to pass over the end of the corresponding tab 46 and then, with the clasp 49 held in this position, rocking the corresponding lever 48 about its fulcrum 48a to an over-center position, as shown in FIG. 6, in which the clasp 49 is latched over the tab 46.

Accordingly, it is apparent that when the clasp 49 of each of the tension latches 47, located adjacent the respective opposite ends of the back 6 of the brake head 6, is thus latched over the corresponding tab 46 of the backing plate 45, this backing plate and the brake shoe 44 bonded thereto are securely fastened to the brake head 3 in such a manner that this brake shoe 44 and its backing plate 45 may be easily removed from the brake head 3 without the necessity of removing this brake head 3 from the arm 14 of the double-arm brake lever 15 shown in FIG. 1.

It is evident that at the time of manufacture of new brake heads for use with composition brake shoes 44 each of which has a backing plate 45, a pair of tension latches 47 may be secured to the respective opposite ends of the back 6 of each new brake head by brazing, welding, riveting or some other suitable means.

DESCRIPTION — FIGS. 7, 8 and 9

A third embodiment of the invention is shown in FIGS. 7, 8 and 9 wherein the brake shoe 3 shown in FIG. 1 is modified to receive a composition brake shoe 50 which is constructed as described below.

As in the previous embodiments of the invention, prior to bonding the brake shoe material to a metal backing plate 51, only one half of which appears in FIGS. 7 and 8, this backing plate 51, which is a thin, rectangular metal plate bent to the curvature shown in FIG. 8, is provided adjacent each of its ends, as by stamping operation, with a tab 52, only the lower tab appearing in FIGS. 7, 8 and 9.

In order to adapt the brake head 3, from which a worn wood brake shoe 1 (FIG. 1) has been removed, to receive the composition brake shoe 50 having the backing plate 51 that is provided with the tabs 52, a pair of openings 53 are provided, as by a milling operation, in the brake head 3, only one of these openings appearing in FIGS. 7, 8 and 9.

As is apparent from FIGS. 7 and 8, these openings 53 extend through the brake head 3 from the concave brake shoe receiving surface 2 to the back 6 and inward from each end of the back 6 far enough, as best illustrated in FIG. 8, to enable a corresponding tab 52 to be disposed therein.

The brake head 3 is further modified by having secured thereto, as, for example, by welding, a pair of lugs or locking members 54 only one of which appears in FIGS. 7 and 9. Each of these lugs 54 is so disposed in parallel spaced-apart relation to a corresponding tab 52 as to enable the respective lug 54, corresponding tab 52, and web 8 to be provided with coaxial bores 55, 56 and 57, as shown in FIG. 9, it being noted that the bores 55 and 56 are of the same diameter which is somewhat less than the diameter of the bore 57.

As best shown in FIG. 9, the bores 55, 56 and 57 receive a suitable locking pin 58 which, for example, may be a button handle ball lock pin manufactured by Carr Lane Manufacturing Company, St. Louis, Mo.

It is apparent from the foregoing that when a locking pin 58 extends through the bore 56 of each of the tabs 52 of the backing plate 51 and the bores 55 and 57 in the corresponding lug 54 and the web 8, this backing plate 51 and the composition brake shoe 50 bonded thereto are securely fastened to the brake head 3 in such a manner that this brake shoe 50 and its backing plate 51 may be easily removed from the brake head 3 when worn out without removing this brake head from the arm 14 of the brake lever 15 shown in FIG. 1, since each button handle ball locking pin 58 is so constructed that, upon depressing a button 59, a pair of locking balls 60 are drawn into the pin 58 after which it may be manually withdrawn or pulled out of the bores 55, 56 and 57.

Therefore, after each of the locking pins 58 has been thus withdrawn from the corresponding tab 52, the brake shoe 50 and its backing plate 51 may be removed from the brake head 3. Thereafter, another brake shoe 50 having a backing plate 51 may be secured to the brake head 3 by the same pair of locking pins 58.

As pointed out in connection with the previous embodiments of the invention, if new brake heads are to be manufactured for receiving the composition brake shoe 50 and its backing plate 51, the lugs 54 may be cast integral with each new brake head.

Having now described the invention what I claim as new and desire to secure by Letters Patent, is:

1. A brake head and brake shoe assemblage for use in a railway vehicle brake apparatus, said assemblage comprising:
  a. a brake head having a concave brake-shoe-receiving surface, a back and a pair of parallel spaced-apart webs integral with and extending outward from said back,
  b. a brake shoe, and
  c. a backing plate having said brake shoe secured thereto, wherein the improvement comprises locking means for locking said backing plate to said brake head, said locking means comprising:
  d. a pair of apertured tabs formed integral with the respective opposite ends of said backing plate,
  e. a pair of internally-threaded locking elements each separately secured to one of the opposite ends of said back of said brake head, and
  f. a pair of cap screws each extending through the aperture in one of said tabs and having screw-threaded engagement with the internal screw threads in the corresponding locking element whereby said pair of cap screws releasably secure said brake shoe to said brake head.

2. A brake head and brake shoe assemblage, as recited in claim 1, further characterized in that each of said locking elements comprises a metallic anchor member welded to said back of said brake head in such a position as to support thereon one of said pair of tabs.

* * * * *